Oct. 16, 1934.  E. E. COMSTOCK  1,977,229
MACHINE FOR CLASSIFYING FINGER PRINTS
Filed Aug. 6, 1930  6 Sheets-Sheet 1

INVENTOR.
ERNEST E. COMSTOCK

ATTORNEY

Oct. 16, 1934.  E. E. COMSTOCK  1,977,229
MACHINE FOR CLASSIFYING FINGER PRINTS
Filed Aug. 6, 1930   6 Sheets-Sheet 4

INVENTOR.
ERNEST E. COMSTOCK

ATTORNEY

Oct. 16, 1934.  E. E. COMSTOCK  1,977,229
MACHINE FOR CLASSIFYING FINGER PRINTS
Filed Aug. 6, 1930  6 Sheets-Sheet 5

INVENTOR.
ERNEST E. COMSTOCK
BY
ATTORNEY

Oct. 16, 1934.  E. E. COMSTOCK  1,977,229
MACHINE FOR CLASSIFYING FINGER PRINTS
Filed Aug. 6, 1930   6 Sheets-Sheet 6

INVENTOR.
ERNEST E. COMSTOCK
BY
ATTORNEY

Patented Oct. 16, 1934

1,977,229

UNITED STATES PATENT OFFICE 1,977,229

MACHINE FOR CLASSIFYING FINGER PRINTS

Ernest E. Comstock, El Centro, Calif., assignor of eight per cent to Phil D. Mastenbrook, El Centro, Calif.

Application August 6, 1930, Serial No. 473,465

55 Claims. (Cl. 235—58)

This invention relates to means for classifying finger prints.

Important objects of this invention are first; to provide means, whereby to mechanically add the values, that compose the numerators and denominators of the 1024 primary classification fractions of finger prints, as used under the Henry system and when so added to provide means in conjunction therewith, whereby to print the same on a finger print card ready for filing; second, to provide means, whereby to set and record the sub-classification and second subclassification of finger prints as used under the Henry system; third, to provide means whereby to set and record the lettered classification of finger prints used under the Henry system, of which there are over 400,000; and fourth, to provide means, whereby to set and record the final classification of finger prints as used under the Henry system.

Further important objects, advantages and features of the invention will hereinafter appear.

To make more evident the broad scope of the objects of the invention and to provide a clearer understanding of the purpose of the machine, a few introductory remarks relating to the present method of taking and classifying finger prints will now be given.

Finger prints are taken on an 8" by 8" card, the right hand finger prints being placed on the top horizontal line of spaces, and the left hand finger prints being placed on the lower line of spaces. They are taken in the following order: top line, right thumb, right index, right middle, right ring and right little finger. On the lower line, starting under the right thumb print, the fingers of the left hand are taken in the same order: thus, bringing thumb under thumb, index under index, etc. The first joint of the fingers are inked and a rolled impression is taken. Here, a thumb is considered a finger—a thumb print, a finger print.

After the finger prints have been taken, they are classified for filing. All the finger prints are composed of eight distinct patterns and arranged in two groups. Group I, consists of loops, both radial and ulnar; arches, and tented arches. Group II, consists of whorls, central pocket loops, twinned loops, lateral pocket loops and accidentals. The prints of Group I, have no numerical value for primary classification purposes, while the prints of Group II do, said value depending on their position in the set. It is the sum of these values that make the 1024 primary classification fractions used under the Henry system.

The prints are taken in pairs, all of the ten fingers being considered. First pair: right thumb finger and index finger; second pair; right middle finger and ring finger; third pair; right little finger and left thumb finger; fourth pair; left index finger and middle finger; fifth pair; left ring finger and little finger. Patterns in the first pair belonging to Group II, have a value of 16 each, in the second pair; 8 each, in the third pair; 4 each, in the fourth pair; 2 each, and in the fifth pair; 1 each. A pattern in any pair that belongs to Group I, has no numerical value for primary classification purposes.

The values, if any, of the first finger of each pair, are added to form the denominator of the fraction and the values of the second finger of each pair, if any, are added to form the numerator. To this fraction, for reasons to be stated further on, the fraction $$\frac{1}{1}$$

is always added, the complete fraction being the primary classification.

For the sub-classification, the index fingers or the index and middle finger, and in large collections, the index, middle and ring fingers of both hands are considered. They are represented by letters A, T, R, U, I, M, O, and in some cases W is used.

The small letters $a$, $t$, and $r$ are also used. There may be a whorl, loop or lettered classification. Whorls are represented by I, M, or O as determined from ridge tracing. Loops are represented by I or O as determined from ridge counting. The lettered series of classifications are represented by the scheduled series of the Henry system of which one example is here shown. These schedules show that all the finger prints of the lettered series aforesaid belong to Group No. I and therefore have no numerical value for primary classification purposes, but in order to provide a proper place for them in the files, they are given a primary classification of $$\frac{1}{1}.$$

One of the series, i. e., $$\frac{A}{A},$$

of said lettered classification of the Henry system shows that both index fingers are arches. The other 8 fingers may be radial loops, arches or tented arches, represented by $a$, $t$, or $r$. Capital letters are used for the index fingers and small letters for the others. Ulnar loops are only considered when in the index fingers.

Since each finger can be an *a*, *t*, or *r*, not considering the index which are shown by the capitals, it is possible to arrange these letters of the Henry system in the numerator into 160 different combinations, the right hand being above the line and only the left index finger below. If we reverse the lettering, right index above and left hand below, the denominator may have likewise 160 combinations. Since the 160 different combinations in the numerator may be used with the 160 different combinations in the denominator, there is possible 160 x 160 different combinations which equals 25600 different combinations. Each change of the capital letter in an index finger will make 25600 more combinations in the lettered series of classification of the Henry system with but four exceptions.

The final classification, if any, of finger prints, consists of the ridge count of the little finger or either or both hands if they are loops. The actual count of the right little finger is entered above the fraction line and that of the left little finger below, thus forming a final classification fraction. However, if only one little finger has a ridge count, as the right, it is entered above the dividing line of the fraction, the space below being left blank. The case is reversed when the left little finger is counted. In the latter event the count is entered below the fraction line, and the space above left blank.

Under the present Henry system it is quite possible to make an error in addition, altho the only figures to be added are 16, 8, 4, 2, 1. Also, at times, a classifier may fail to add the $$\frac{1}{1}$$

fraction, thus causing the finger print set to be placed improperly in the files. Errors are liable to creep in during busy times with the most expert operators. Since my invention adds the primary values mechanically no error can originate by a mistake in addition. It is impossible to fail to add the $$\frac{1}{1}$$

fraction, as it is automatically added to every fraction at the start. In other words, the primary recording drums always read $$\frac{1}{1}$$

to begin with and the various values are added to it. In finger print sets containing finger prints that have no numerical value, the primary fraction $$\frac{1}{1}$$

is always set up and ready to print. The complete classification will be uniform on all cards, easy to read and far better than at present as the average person is a poor letterer.

Frequently, in sets having missing fingers, it is necessary to imagine what pattern of prints the missing fingers may be, then figure all the possible primary classifications, etc., and afterwards proceed to search the files.

The following from the Finger Print Instructor, by Kuhne, will serve as an illustration. A set having the right hand amputated, with a whorl in the left thumb, and the remaining four fingers ulnar loops, would give the following 32 primary classifications, under which the same should be properly searched.

| 5 | 13 | 21 | 29 | 5 | 13 | 21 | 29 | 5 | 13 | 21 | 29 | 5 | 13 | 21 | 29 |
|---|----|----|----|---|----|----|----|---|----|----|----|---|----|----|----|
| 1 | 1  | 1  | 1  | 5 | 5  | 5  | 5  | 9 | 9  | 9  | 9  | 13| 13 | 13 | 13 |
| 5 | 13 | 21 | 29 | 5 | 13 | 21 | 29 | 5 | 13 | 21 | 29 | 5 | 13 | 21 | 29 |
| 17| 17 | 17 | 17 | 21| 21 | 21 | 21 | 25| 25 | 25 | 25 | 29| 29 | 29 | 29 |

It would be filed under $$\frac{5}{17}$$

if not already filed as amputated. Each finger taken individually represents two changes in the primary classification when amputated and it is necessary to imagine what they are and compute the above fractions. With the use of this finger print classification machine the computing is done mechanically, saving time and labor and if desired may be printed on a separate sheet for reference. Finger print circulars are often received unclassified. They too may be classified, the classification subsequently impressed on them and then filed away for future reference.

All the classifications used in the Henry system may be set up and printed by my machine on the cards.

The capital letter W is added for convenience on each of the two index finger drums. While not in strict accord with the Henry system, it is used with the other capitals for index fingers by some bureaus and by the government.

The final classification drums start with a blank and end with the numeral 31. The blank is for finger print sets which have no final classification, since the final classification drums are depressed along with the other drums whether they have been previously set or not.

A few finger print classifications will now be shown and their meaning explained.

*Finger print classification Example 1.—*

$$\frac{1\ aA\ 13}{1\ rU\ —}.$$

The complete set belongs to Group I. It is given the primary classification $$\frac{1}{1}.$$

The right index finger is an arch, represented by the capital letter (A). The left index finger is an ulnar loop, represented by the capital letter (U). The right thumb finger is an arch, represented by a small (a). The left thumb finger is a radial loop, represented by small (r). The right little finger has a ridge count of 13. The left little finger is not counted. The remaining fingers in the set are all ulnar loops.

*Finger print classification Example 2.—*

$$\frac{29\ 0\ 18}{20\ 0\ —}.$$

The right thumb finger, index and ring fingers of the right hand, the left thumb finger, index and ring fingers of the left hand all pertain to Group II. Their values, plus $$\frac{1}{1}$$

equals $$\frac{29}{20}.$$

Both the index fingers are outer, represented by capital (O) and are whorls. The right little finger has a count of 18 ridges. The other fingers are all ulnar loops and are not considered.

*Finger print classification Example 3.—*

$$\frac{1\ R\ OO\ 16}{1\ U\ IO\ -}.$$

The complete set is all loops. They all belong to Group I and are given a primary classification of $$\frac{1}{1}.$$

The right index finger is a radial loop represented by capital (R). The left index finger is an ulnar loop, represented by capital (U). The right index and middle fingers are outer loops represented by capitals (OO). The left index finger is an inner, represented by capital (I). The left middle finger is an outer, represented by a capital (O), therefore taken together will read (IO). The right little finger has a ridge count of 16. All the other fingers are ulnar loops.

*Finger print classification Example 4.—*

$$\frac{31\ MO\ 13\ Amp}{12\ MI\ -\ -}.$$

The primary classification is found in the usual manner. Both index fingers in this particular classification are classified as meeting whorls, because they are both amputated, and are represented by capital (M). Both of the middle fingers are whorls: outer represented by capital (O) and inner represented by capital (I). The right little finger has a ridge count of 13. The right thumb, little finger, and left little finger, are all ulnar loops. All the other fingers are whorls. This accounts for the high number in the numerator and the comparatively low number in the denominator, the first fingers of the first and third pairs being loops have no numerical values.

Referring in detail to the drawings, a split casing 1, (Fig. 1) houses the interior working parts of the machine. It is divided in two detachable sections 2 and 3, the section 2 providing a cover for the mechanism adapted for computing the 1024 primary finger print classification fractions and the section 3, providing a cover for the mechanism adapted for computing and recording the sub, second sub and final finger print classification fractions. Means are provided to fasten the two sections 2 and 3 to a supporting frame 4, (Figs. 3 and 4) and a base 5; consisting of a plurality of screws 6 for the section 2, and a plurality of screws 7 for the section 3.

The base 5 is preferably constructed of wood and is provided with a pair of channel grooves 8 wherein the flanges 9 of a bed plate 10 are adapted to slide. The base 5 is also recessed to accommodate the insertion of ink pads 11 and 12, (Fig. 20), there being ample clearance provided between the bottom of the bed plate and the top of the pads for the bed plate to slide freely in and out thereover.

Figure 20:
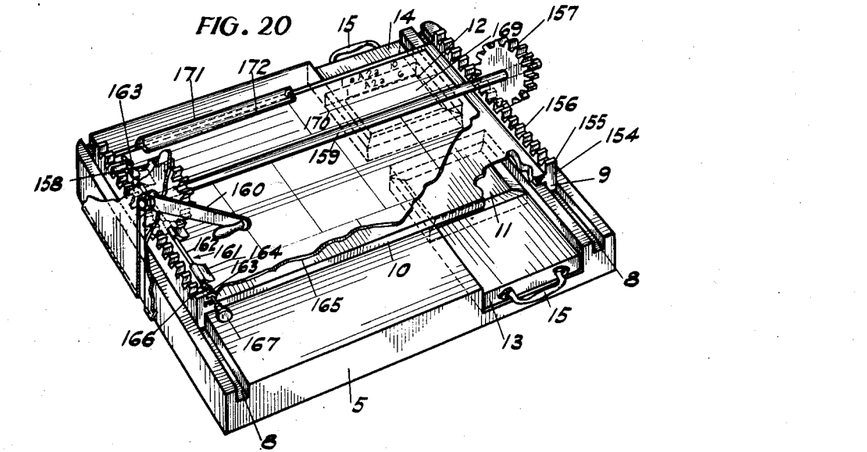
Fig. 20 is a perspective of the base, bed plate and the operating mechanism used in conjunction therewith.

The ink pads are provided with extension portions 13 and 14 and to each of them is fastened a handle 15, the extensions preferably extending outwardly from the pads sufficiently to be flush with the face of the base 5. This enables one to withdraw said pads for inking or renewal, while the extensions fill the recesses and add to the machine's appearance.

Figures 1, 2:
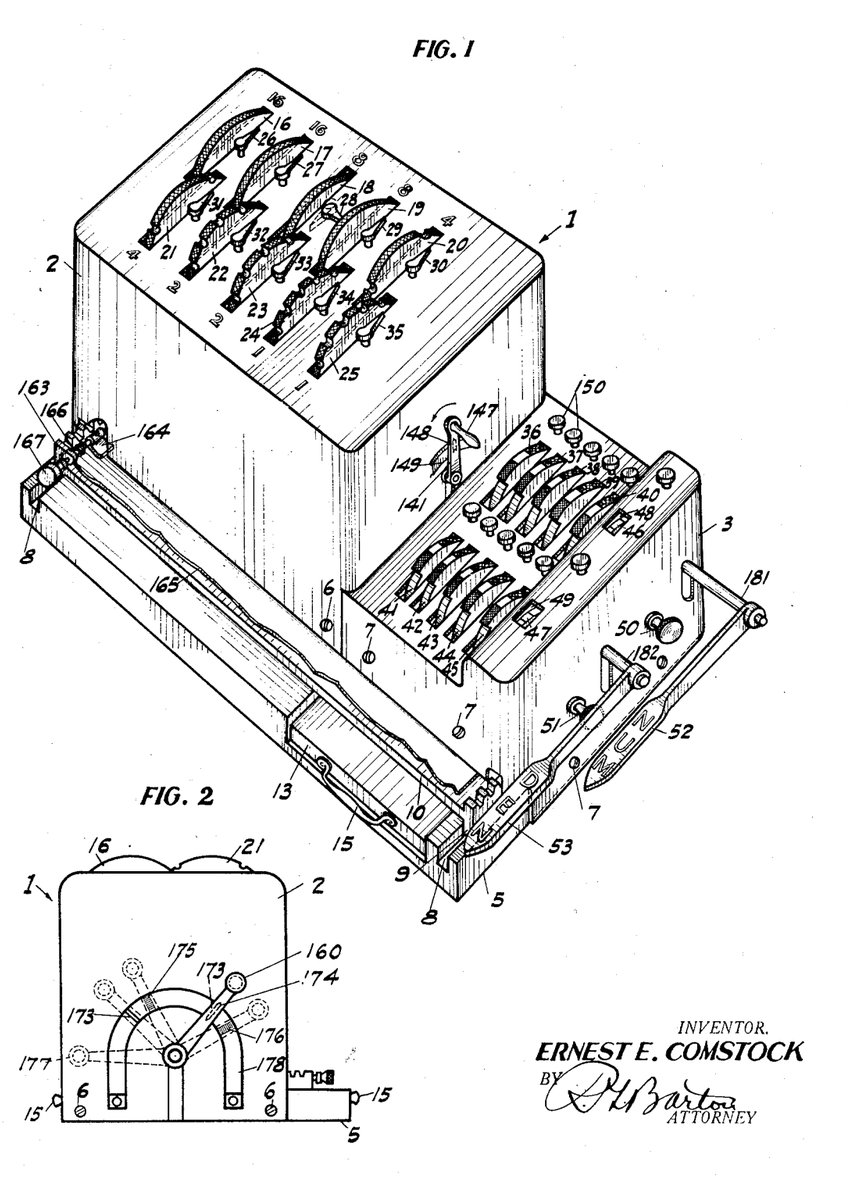
Fig. 1 is a perspective view of a machine embodying the invention.
Fig. 2 is a left hand side elevation.

Through the top of section 2 of the casing 1 extend the operating discs 16, 17, 18, 19, 20, 21, 22, 23, 24 and 25. Since the finger print impressions are taken in pairs, for primary classification only, the operating discs are also arranged in pairs, the finger print value of each pair being printed adjacent its respective operating disc, said finger print values being 16, 8, 4, 2 and 1 and printed boldly on the top of the casing cover. The operating discs 16 and 17 each have a finger print value of 16 each; operating discs 18 and 19, 8 each, operating discs 20 and 21, 4 each; operating discs 22 and 23, 2 each, and operating discs 24 and 25, 1 each.

There is a plurality of manually operable levers 26, 27, 28, 29, 30, 31, 32, 33, 34 and 35, which cooperate with their respective operating discs. When these levers are in the up position their cooperating gear is disengaged; when they are turned to the right their cooperating gear is engaged and when in the down position their cooperating gear is disengaged. The latter position is also used to denote when certain discs have been used in making a computation.

All the operating discs have a knurled surface on their outer periphery and they extend sufficiently above the top of the cover so that one's finger may be easily slided therealong to accomplish the amount of rotation desired.

Through the top of section 3, of the casing 1, extend the sub, and second sub, finger print classification drums 36, 37, 38, 39, 40, 41, 42, 43, 44, and 45, drums 36 to 40 inclusive being the numerator drums and 41 to 45 inclusive being the denominator drums.

These drums like the operating discs just described are partly knurled and extend to a sufficient height above the casing cover to make their operation feasible.

In Fig. 1 the primary finger print classification drums and the final finger print classification drums are not operated exteriorly of the casing as the sub and second sub classification drums. However, the character to be recorded by the final classification drums 46 and 47 may be viewed through windows 48 and 49 and operated exteriorly of the casing by knobs 50 and 51.

The numerator drums which record the numerator portion of the finger print classification fraction are actuated by the handle 52 marked Num; and the denominator drums which record the denominator portion of the finger print classification fraction are actuated by the handle 53 marked Den.

The operating discs, the primary, sub, second sub and final finger print classification drums will now be described more in detail with their cooperating gears with special reference to Figs. 3, 4, 5, 6 and 12.

Figure 12:
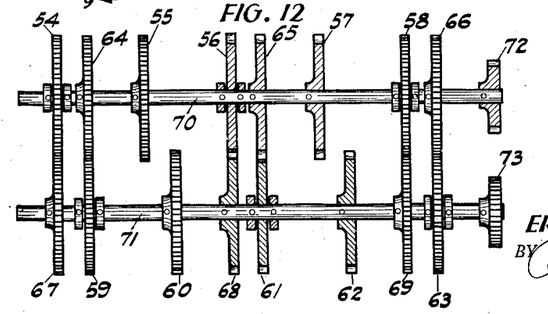
Fig. 12 is a top plan and part sectional view of the gear assembly which operates the primary classification drums.
Figure 13:
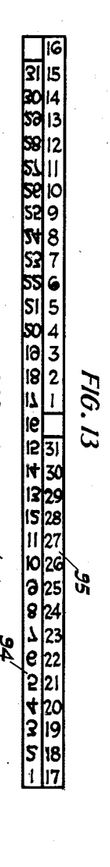
Fig. 13 is an outstretched peripheral view of one of the final classification drums.
Figure 14:
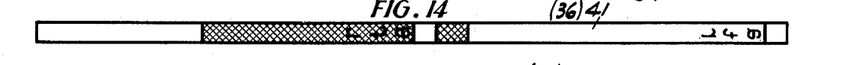
Figs. 14, 15, 16, 17 and 18 are outstretched peripheral views of the sub and second sub classification drums.
Figure 15:
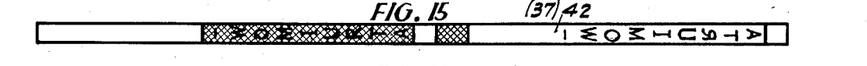
Figure 16:
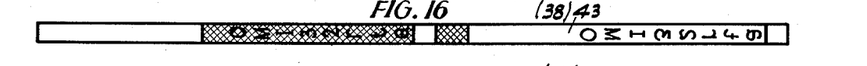
Figure 17:
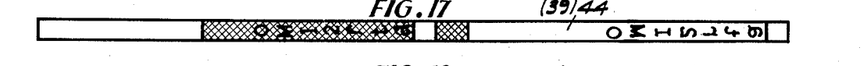
Figure 18:
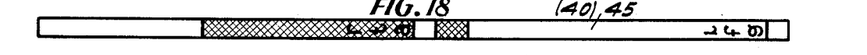

Fig. 12 shows a plan view of the gear assembly apart from its cofunctioning parts, while Figs. 3, 4, 5 and 6 show them correlated.

Gears 54 to 69 inclusive are spaced on shafts 70 and 71 as shown in Fig. 12. Gears 64, 55, 65, 57, 66, 67, 60, 62 and 69 each have an integral hub on the left hand side, are made fast to and turn with the shafts 70 and 71.

Gears 54, 56, 58, 59, 61 and 63 idle on their respective shafts, they being spaced by a collar on either side set screwed to the shaft.

Gears 54 and 67, 64 and 59, 56 and 68, 65 and 61, 58 and 69, 66 and 63 are in mesh with each other at all times. Gears 72 and 73 are made fast to their respective shafts and engage with gears 74 and 75, (Figs. 3 and 4) on the primary finger print classification denominator and numerator drums 76 and 77 respectively, that set just below them.

Figure 3:
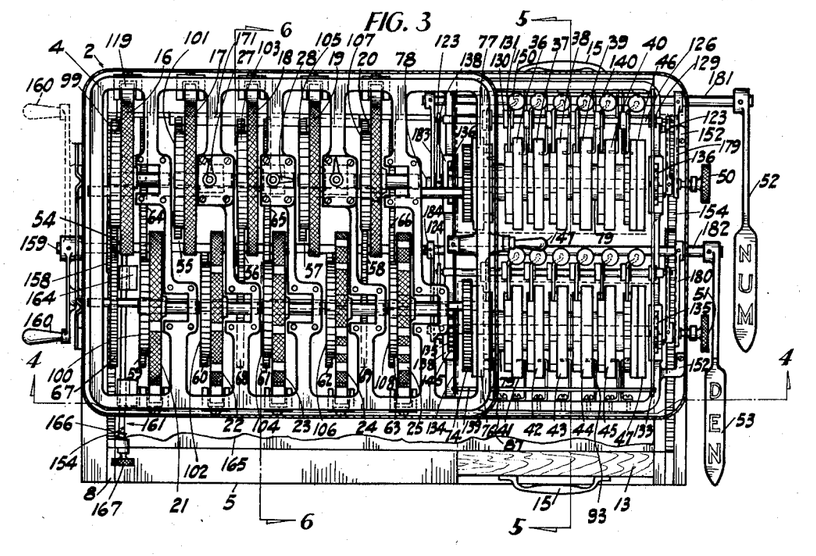
Fig. 3 is a top plan sectional view.

The primary classification numerator drum 77, the sub and second sub classification numerator drums 36, 37, 38, 39 and 40, and the final classification numerator drum 46 are free to turn on shaft 78, they being properly spaced and separated as shown in Fig. 3 by spacers 79.

The primary classification denominator drum 76, the sub and second sub classification denominator drums 41 to 45 inclusive, and the final classification denominator drum 47 are similarly mounted on shaft 80 with spacers 79 spacing them apart.

However the spacers which space each primary classification numerator and denominator drum apart from the adjacent subclassification numerator and denominator drum, and the spacers which space each second subclassification numerator and denominator drum apart from the adjacent final classification numerator and denominator drums should be of such construction that the distance existing between the contiguous faces of the particular drums thus spaced would be slightly greater than that existing between the contiguous faces of the remaining sets of subclassification numerator drums and denominator drums not mentioned. Being thus arranged the classification fraction when printed from the latter drums will have a much more closely arranged appearance as for example like the fraction which is shown on the card in Fig. 21.

For convenience, gears 54 to 63 inclusive are assumed as being 2" in diameter, and as having 64 teeth, and gears 72 and 73 as 1" in diameter, and having 32 teeth. The gear portions 74 and 75 of the primary denominator and numerator drums respectively are the same as gears 54 to 63.

Drums 77, 36, 37, 38, 39, 40 and 46 compose the numerator drum set, and 76, 41, 42, 43, 44, 45 and 47 compose the denominator drum set.

Figure 19:
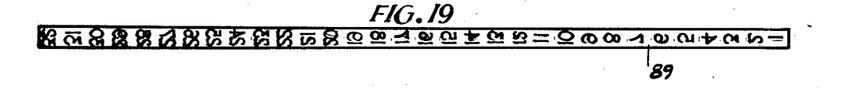
Fig. 19 is an outstretched peripheral view of one of the primary classification drums.
Figures 21, 22, 23, 24, 25, 26, 27, 28, 29, 30, 31, 32, 33, 34, 35:
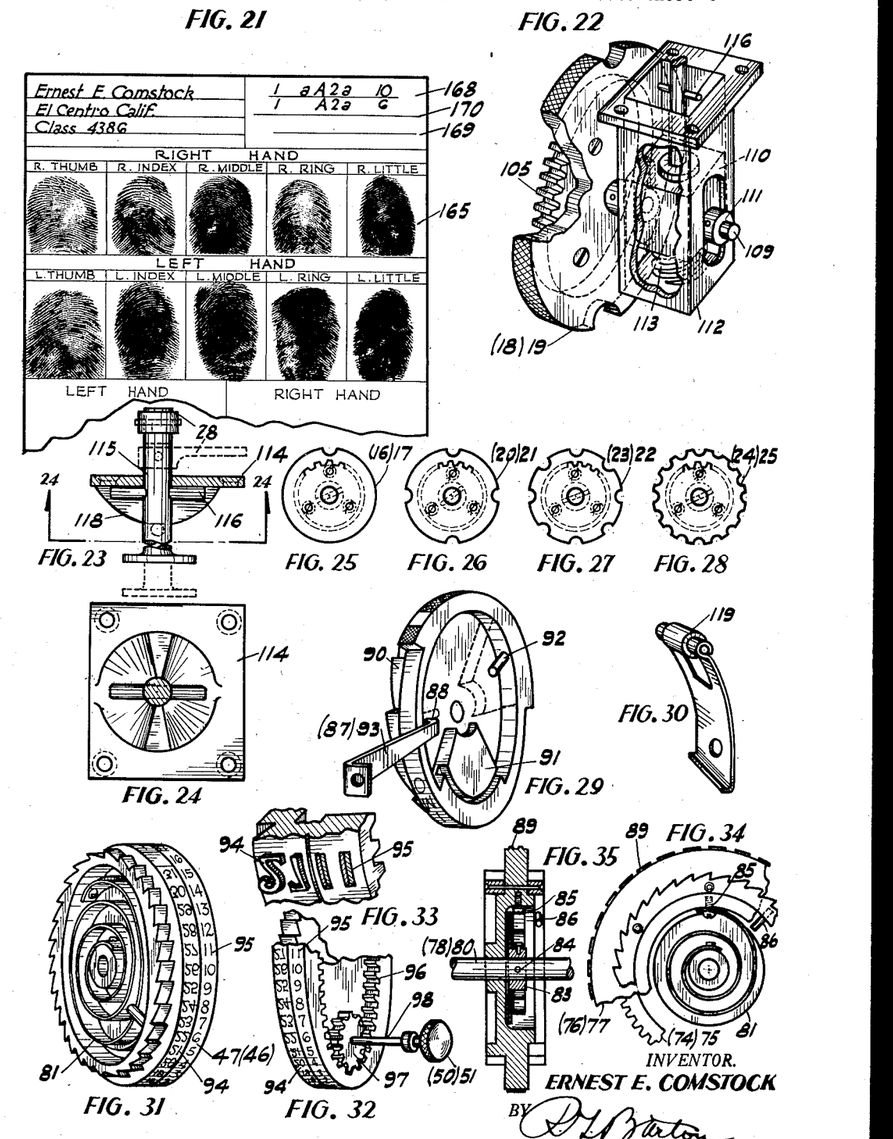
Fig. 21 is a fragmentary portion of a typical finger print card with a set of plain finger prints impressed thereon.
Fig. 22 is a perspective view of one of the individual operating discs used in calculating the primary classification fractions, parts being broken away to show some interior construction.
Fig. 23 is a side and part sectional elevation illustrating a typical manually operable mechanism for engaging and disengaging the various operating discs with their cooperating gears.
Fig. 24 is a section taken on the line 24—24 of Fig. 23.
Figs. 25, 26, 27 and 28 are side elevational views of operating discs.
Fig. 29 is a perspective view of one of the sub-classification drums showing its relative starting and stopping position.
Fig. 30 is a perspective view of one of the operating disc pawls.
Fig. 31 is a left hand perspective view of one of the final classification drums.
Fig. 32 is a fragmentary right hand perspective view of one of the final classification drums together with its operating mechanism.
Fig. 33 is a perspective view showing a portion of the peripheral surface shown in Figs. 31 and 32 greatly enlarged.
Fig. 34 is a fragmentary portion of a right hand side elevation of the primary classification drum.
Fig. 35 is a complete vertical mid-cross sectional view of the structure shown in Fig. 34.

Fig. 34 shows a portion of the right side of the primary classification drums 76 and 77. Fig. 31 shows the left side of the final classification drums 46 and 47. The right side of one is similar to the left side of the other. The left side of drums 76 and 77 have 64 teeth gears 74 and 75 of the same diameter as gears 54 to 69 to engage with gears 72 and 73. The right side of drums 76 and 77 have 32 teeth ratchet gears, one tooth for each number on the faces on the drum (Fig. 19).

The right side of drums 76 and 77 and the left side of drums 46 and 47 are recessed to contain a clock spring 81, said clock spring being shown in Figs. 31 and 34.

One end of said spring is fastened by a pin extending into a collar 83, said collar being secured to the shaft 78, (80) by a pin 84 (Fig. 35). The other end of the spring is fastened to the inner side of the drum by a machine screw 85 (Fig. 34).

A stop pin 86 is carried by and extends radially inwardly from the ratchet tooth rim and is adapted to engage a laterally projecting arm 87, whereby to limit the rotation of the wheel on which the ratchet is mounted, to a single revolution (Figs. 34 and 35). The arm 87 is secured to the frame 4, it extending outwardly from the frame 4 between the drums (Fig. 3), there being provided a flange 88 on said arm to strike against the stop pin 86.

The tension in the spring 81 restores the drum to its normal position when released.

Normal position for the primary drums, means the numeral 1 on the periphery, is face down on a vertical line thru the drum's center. The face of both drums is numbered from 1 to 32 inclusive (Fig. 19) with raised numerals 89 so as to print when depressed, the numeral which the drum is set for. The numerals 89 are illustrated upside down and appear as they do when one looks at a rubber dating stamp.

The primary drums 76 and 77 in fact all fourteen drums (Fig. 3) are free to turn on their respective shafts between spacers 79 that separate them. Both primary drums are identical in construction.

The sub and second sub classification drums 36, 37, 38, 39, 40 and 41, 42, 43, 44, 45, are identical in every way, except for the numerals and letters on their faces. Fig. 29 shows a perspective view of one of them. These subdrums are of the same diameter as the primary drums, but with this difference, however, a portion of said drums is of greater diameter as shown to provide for convenient manual manipulation. The left hand side of these subdrums have ratchet teeth 90 corresponding to the letters and numerals on their face. The right side is hollowed out and contains a grooved counterweight 91 as shown. The enlarged portion of the drum face will extend thru the slot in the cover of the machine to permit the operator to rotate it. This enlarged portion of the face has a knurled surface and the lettering thereon is stamped into it. Diametrically opposite each letter or number on the enlarged portion is a corresponding raised letter or number on the smaller portion (Figs. 14 to 18). Thus, if the portion extending thru the slot is turned to A, an A will be in a position to print at what would be the lower center of the counterweight, but on the face of the drum. Figs. 1, 14, 15, 16, 17 and 18 show how the faces of these drums, taken in pairs are lettered. A stop pin 92 and an arm 93 for each drum operates to limit the rotation of the drums similarly to the way as explained for the primary drums. When the drums are released, after having first been set, the counterweight 91 will return them to normal position by gravity, the arm 93 and pin 92 preventing the drums from turning completely over (see dotted position Fig. 29) and also act as a bumper to stop the drum when it is returned to normal position until locked in the latter position. The drum locking arrangement follows in detail further on. Normal position for the sub and second sub classification drums means such a position that if they were to be depressed, nothing would be printed, since a one-third or less, of the face of these drums is used only in the printing and therefore the enlarged part of the drum can not interfere or come in contact with the surface of the bed plate.

The final classification drums 46 and 47 are similar to the primary classification drums 76 and 77, but are double faced, (Figs. 13, 31, 32 and 33). The left hand face is numbered, starting with a blank space, not a zero, but blank 1, 2, 3, etc. to 31. The right hand face has the same system of numbering, but in this order, viz: 180° from the blank on the left face, is blank on the right face, then the same applies to each numeral, since the drum is revolved toward the operator when he faces the machine. The numerals 94 on the left face are raised and the numerals 95 on the right face are stamped into it. The left side of these drums have ratchet teeth the same as the primary drums, one tooth for each number, and are hollowed out to contain the clock spring 81, as shown for the primary drums. An internal circumferential gear 96, as shown in Fig. 32, is set or turned by an intermeshing gear 97 mounted on a shaft 98 with either knurled knob 50 or 51 attached thereto whereby it may be manually manipulated exteriorly of the casing, (Fig. 1). This pair of drums also revolve on their respective shafts, 78 and 80. The numerals 95 on the right hand face of both drums are read thru windows 48 and 49 in the cover as shown in Fig. 1.

In each window it will be observed a blank is shown, that is because the final classification drums are set at the normal position.

Above each of the gears 54 to 63 inclusive, is an operating disc gear 99, 100, 101, 102, 103, 104, 105, 106, 107 and 108 shown in Figs. 3, 4, 5 and 6, said gears being affixed to the left side of each of their respective operating discs, of which they form a part and have the same diameter and number of teeth as gears 54 to 63. In Fig. 3 said disc gears are shown of a lesser diameter to illustrate their relative relation with the gears with which they mesh there-below. One of the discs 19 for example, is shown by itself in Fig. 22. The disc is mounted upon a short axle 109, said axle fitting into a block 110, and held by a collar 111. Said block 110 slidably fits within a holder 112. The block 110 sets on a coil spring 113, that rests on the bottom of the holder 112.

Figure 4:
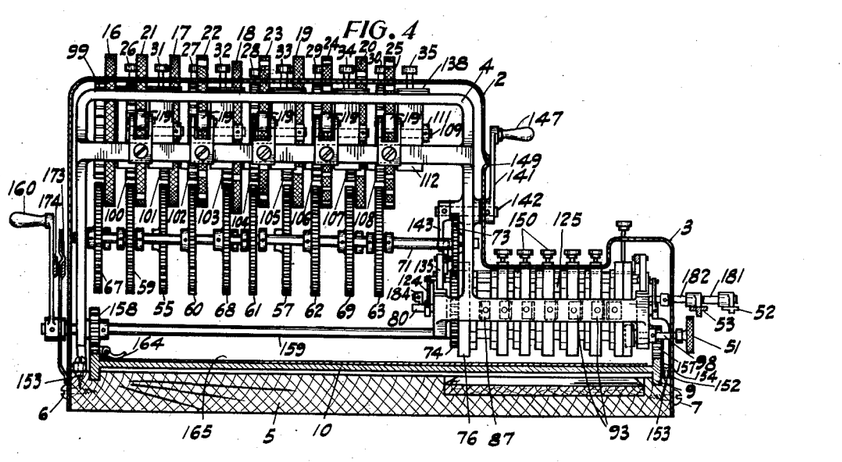
Fig. 4 is a section taken on the line 4—4 of Fig. 3.

Through the top 114 of holder 112 (Figs. 23 and 24) is extended a rod 115 fastened to the sliding block 110 and through said rod just underneath said top 114 is fastened a cross piece 116 and attached to the top of rod 115 is an operating lever 28. Lever 28 when turned to dotted position at the right, (Figs. 1 and 23) will cause the cross piece 116 in rod 115 to follow the cam surface 118, depressing the block 110 against spring 113, whereby to bring into mesh the gear portion 105 of disc 18 with the gear 56 over which it sets. Fig. 4 shows all the discs over their respective gears disengaged, except operating disc 18 which is shown in engaging position in Figs. 1 and 4.

The depth of the cam surface 118, is such, that when the block 110 is depressed the operating disc gears and assembly gears will properly mesh. Figs. 25, 26, 27 and 28 show a left side view of the operating discs 16, 17, 20, 21, 22, 23, 24 and 25. Fig. 22 shows operating discs (18) 19 in perspective. Observing these figures it will be noted that discs 16 and 17 have one notch in their rim surface (18) 19 two notches, (20) 21 four notches, (22) 23 eight notches, and (24) 25 sixteen notches. These notches are to be engaged by the spring actuated pawl roller 119 shown in Fig. 30. There are two each, of the five discs shown in Figs. 22, 25, 26, 27 and 28. A pair (16) 17 for gears 54 and 55, a pair (18) 19 for gears 56 and 57, a pair (20) 21 for gears 58 and 59, a pair (22) 23 for gears 60 and 61, and a pair (24) 25 for gears 62 and 63. No. (18) 19 Fig. 22 shows the face of a disc having knurled surface and notches.

The objects of these notches on the face of the discs are to indicate what part of a revolution the disc is to be turned to compute its value on the primary drums.

The spring actuated roller pawls 119 should be sufficiently stiff to engage the notch in the disc face with a snap or click, to enable the operator to know when he has turned the disc $$\frac{1}{2}, \frac{1}{4}, \frac{1}{8}, \frac{1}{16},$$

part or a whole revolution.

Figure 5:
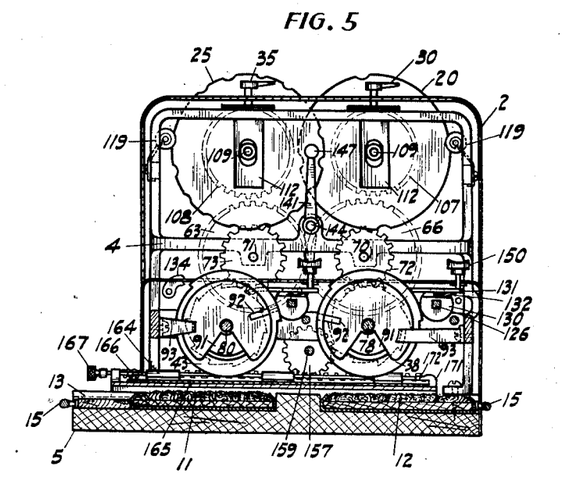
Fig. 5 is a section taken on the line 5—5 of Fig. 3.
Figure 6:
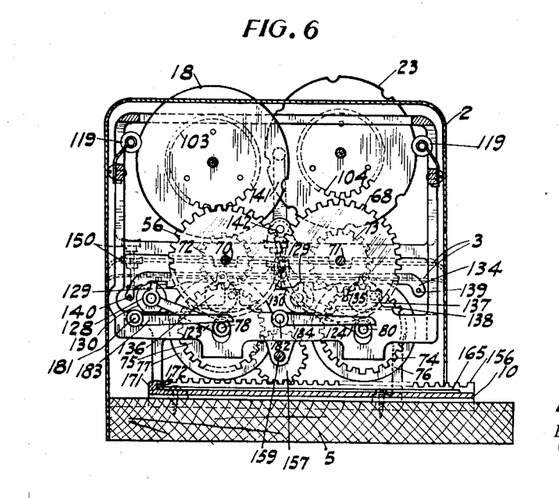
Fig. 6 is a section taken on the line 6—6 of Fig. 3.

The spring actuated pawl roller (Fig. 30) is shown assembled with its cofunctioning parts in Figs. 3 and 4, and particularly in Figs. 5 and 6. In Fig. 5 it will be observed that as the operating discs are depressed the engaging pawls will be depressed therewith by virtue of the resiliency in the spring portion of the pawl and the position of the pawl with relation to its fulcrumed position on the frame.

In Fig. 1 the third operating lever is shown in full lines and turned to the right. It is shown in dotted lines in the same position in Fig. 23. This should be its position when the gear on this operating disc to its left is engaged with the gear below it. From the dotted position the lever may be turned "up" or "down" to disengage the operating disc. They are however usually turned down so as to designate what particular disc has been used in computing a finger print classification.

Figure 7:
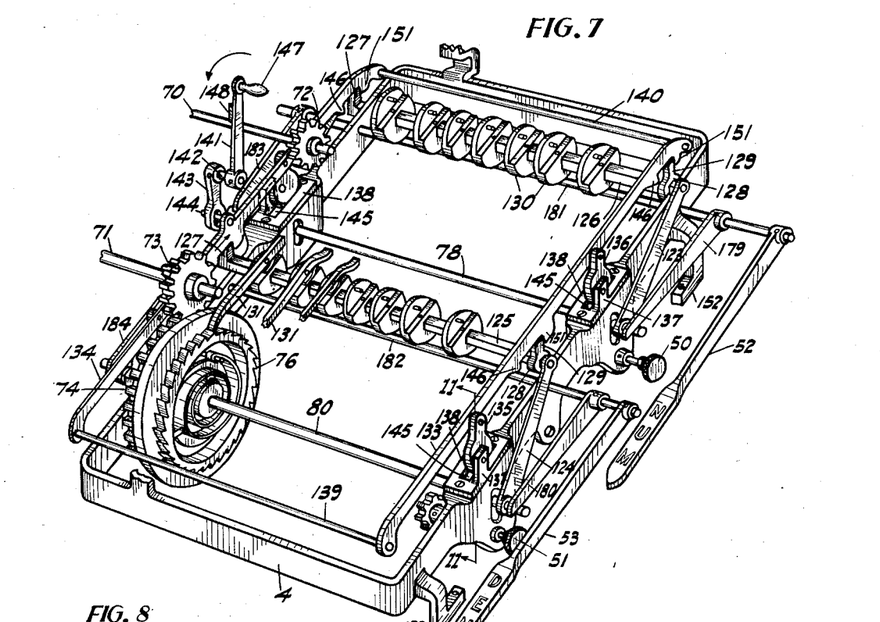
Fig. 7 is a perspective view of the drum set locking and depressing arrangement.
Figure 11:
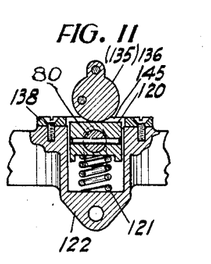
Fig. 11 is a section taken on the line 11—11 of Fig. 7.

The shafts (78), 80 on which the 14 primary, sub, and final printing drums just described are mounted, are set in a block 120 and do not revolve. This block sets on a spiral spring 121 in a block holder 122. Fig. 7 shows a fractional left hand perspective study of the machine without a cover. Drum 76 is shown on shaft 80 in bearing blocks 120, said bearing block being mounted in a holder 122 in which they may slide up and down while resting on spiral springs 121. Fig. 11 is a section further typifying this arrangement. Four toggle arms, two of which are shown in Fig. 7, 123 and 124, are made fast to the shafts 78 and 80 at the approximate angle shown.

Figure 8:
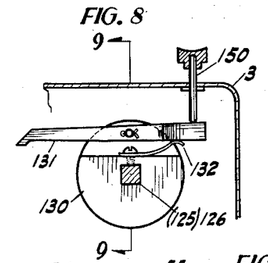
Fig. 8 is a side elevational detail of one of the individual drum releasing mechanisms.
Figure 9:
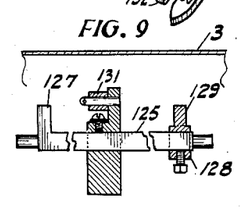
Fig. 9 is a section taken on the line 9—9 of Fig. 8.
Figure 10:
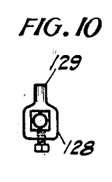
Fig. 10 is a right hand end elevation of a portion of Fig. 9.

These toggle arms adjustably support the two square shafts 125 and 126, also shown in Fig. 7 and more in detail in Fig. 9. These square shafts have an upturned lug 127 on one end and are provided with a dog (128) having a corresponding upstanding lug 129, said dog being adapted for fastening to the shaft at the other end, said shafts having a round extremity whereon one end of the toggle arms 123 and 124 is pivotally mounted. Onto these square shafts are fastened 14 discs 130, 7 on each shaft, spaced as shown in Fig. 7 and made fast so as to turn with their respective shafts. Figs. 8 and 9 show one of said discs, a side and sectional view. The disc 130, and pawl 131, and steel spring 132, all shown in Fig. 8, are assembled as shown in Fig. 7 and mounted on shafts 125 and 126, the 14 pawls 131 engaging the ratchets of the 14 drums; only the primary one of which is shown in Fig. 7. Two truss rods 133, 134 shown in Fig. 7 are connected to four eccentrics 135 and 136; two being shown in Fig. 7, they in turn being connected to an upstanding flange 137 of the bearing holder cap 138 (Figs. 7 and 11).

Two framing rods 139 and 140, Fig. 7, connect with truss rods 133 and 134 at their outer ends as shown to stiffen this carriage portion of the mechanism. The lever 141, Fig. 7, when moved in the direction indicated by the arrow, thru the medium of the shaft 142 and the link 143 bearing upon the pin 144 journalled in the truss rod 134, will cause the eccentrics (135) 136 to depress the bearing blocks 120, by operating thru the slots 145 in the caps of bearing holders 122, said caps being shown in Fig. 7, thus disengaging the gears 74 and 75 on the left hand sides of the primary drums 76 and 77 from the smaller gears 72 and 73. Sufficient clearance is provided between the ear 146 and the lug 129 whereby the carriage may be shifted to release the primary drum gears from their operating gears just described.

A continued motion of the lever as indicated will cause a further shifting of the truss rods and carriage so that the ears 146 on said truss rods will engage with the lugs 127 of the shafts 125 and 126 and the lugs 129 of the dogs 128 mounted on the shafts 125 and 126, thereby rocking said shafts together with all the discs 130 mounted thereon, thus releasing all the 14 drums at once, the primary and final drums returning to normal by clock spring tension and the lettered or sub-classification drums by gravity. The ears 146 and 151 should be spaced sufficiently far apart to first detach the primary gear from its operating gear without disengaging the pawls from the driving ratchets and later to engage the lug 129 by the ears 146 on the truss rods to rock the shafts carrying the pawls to disengage them from their ratchet gears whereby the drums may assume their normal position. Being returned to normal or neutral position, the drums are constrained from further movement by contact of the stop pin and arm. Fig. 11 shows a side sectional view of the bearing holder top with the slot in it that the eccentric work through, and its relation to the eccentric cam. Also, a view of the cam and bearing top as assembled may be seen in Fig. 7.

The lever 141 is positioned with relation to the mechanism which it operates (Fig. 7) so that only the portion carrying the hand grip 147 projects outside of the casing 1, as seen in Fig. 1 and said handle portion is provided with a detent 148 which in neutral position engages with a depression in a crescent shaped track 149 on the side of the casing upon which the detent of the lever frictionally engages.

Above said pawl 131, except for the pawls on the primary drums, is a pawl releaser 150 (Figs. 3 and 8). The pawl releasers fit through the top of section 3 of the casing 1, and are used to manipulate the releasing of individual drums. When it is necessary to release the primary drums at any time before setting any of the other drums the lever 141 may be operated to do so.

A pair of complementary ears 151 are provided on the truss rods 133 and 134 whereby to engage with the opposite faces of said lugs, to re-rock said discs to their neutral position. This engagement will be maintained until the operation of shifting again takes place in order to prevent clockwise movement of shafts 125 and 126 thereby assuring proper relation of disc, pawls and ratchet wheels.

The frame 4 supporting the carriage mechanism shown in Fig. 7 is also shown more fully in Figs. 3 and 4. Here it will be observed the feet 152 of the frame 4 in Fig. 7 are screwed to a base 5 shown in Fig. 4 by wood screws 153.

On the base 5 is slidingly mounted the bed plate 10, the operating parts of which will now be described with reference to Fig. 20. The bed plate 10 is provided at its sides with a T shape section 154 the lower flange 9 of the T being adapted to slide in the grooves 8. The upper flange 155 is developed into gear racks 156 and there is provided in conjunction therewith pinion gears 157 and 158 mounted on shaft 159, journalled in the framework 4 and casing 1 and operated by a handle 160 whereby the bed plate is moved in different positions with relation to the base.

To the left hand gear rack is mounted for manual manipulation a card clip 161. The card clip comprises a pin 162 journalled in a pair of ears 163 outwardly projecting from the teeth composing the rack. On to the pin is spaced card engaging clips 164 which are held in yielding position to a card 165 under the action of a rat trap spring 166, a knob 167 extending externally of the casing may be operated to lift the clips under the action of the spring whereby a card may be inserted thereunder.

Fig. 21 shows a fragmentary portion of a typical finger print card, a sufficient amount being shown to impress a set of finger-prints thereon.

The bed plate should be wide enough to accommodate an 8" card. The width of the bed plate, however, from front to rear of machine need not necessarily be 8". Any convenient size will do, so long as it has sufficient length of rack, to be operated by handle 160 and gears 157 and 158 to bring the bed plate under the drum sets to print the classification in the spaces provided for that purpose on the card.

There are two spaces on the card 165 whereon to print the finger print classification, viz. 168 and 169. They are separated by a line 170. Each of the spaces 168 and 169 are also provided with a dividing line to separate the numerator and denominator of the first classification and reference classification, if any.

The card is placed on the bed plate in the position shown in Fig. 20, the left edge of the card being placed under the clips with the extreme edge bearing against the inside face of the gear rack.

The top edge of the card is inserted under a guide 171, said guide has an overlapping lip 172 and it together with the side edge of the gear rack properly positions the card ready for printing.

The lever 160, (Figs. 2 and 20) is manually operated at different positions so that the numerator and denominator portions of the classification fractions come properly spaced above or below the line 170.

For instance in Fig. 2 there is a U gage on which are indications where to set the lever to insure proper printing of the classification on the card. Here the lever is shown full in one position to correspond with the position in Fig. 20 and to also agree with what is printed on the card in Fig. 20 while at that position. On the U gage at said position is a notch 173 wherein a detent 174 on the lever 160 engages. There is also another notch at the second position of the lever shown dotted; counting from left to right.

The first position of the lever 160, that shown in full lines will be the correct position of the card and bed plate with reference to the classification drum when it is desired to print the numerator part of the fraction.

The second position referred to above is the correct position for printing the denominator portion of the fraction.

There are two other positions shown on the U gage printed in colors and indicated by numerals 175 and 176, the numeral 176 indicating the correct position for printing the altered, reference or added numerator portion of the classification fraction and 175 the correct position for printing the altered, reference or added denominator portion of the fraction, last said fraction to appear in the space 169 directly underneath the line 170 on the card. Position 177 indicates the position of the bed plate when in fully open position. The U gage for reference purposes is assigned the numeral 178.

Two levers 179 and 180 are shown in Fig. 7, the free ends of which are resting on the shafts 78 and 80 of both drum sets. These levers are fastened to rods 181 and 182 which extend from the right end of the frame 4 to and through the central portion thereof where the rods terminate. They however extend through their frame far enough to fasten thereto two more levers 183 and 184 similar to 179 and 180.

Onto the right extremity of rods 181 and 182 are fastened operating handles 52 and 53. The handles are positioned so that when the ends of the levers 179 and 180 just rest on shafts 78 and 80 they will be in the horizontal position as shown in Figs. 1, 3 and 7.

A downward motion of handles 52 and 53 will depress the drum sets to the bed plates, the springs 121 under the bearing blocks 120 returning them to their original position. Clearance is provided on either side of blocks 120 so that the teeth of the engaging and disengaging gears will be free from any tendency to drag. The drum locking arrangement being held by the arms that are fastened to the drum shafts will be depressed also, thus holding the drums in a locked position when depressed and until released.

*Operation*

A set of prints having been taken on the regulation card are then classified for filing. Taking them in pairs as previously explained, if either or both of the first pair belong to Group 2 the operating discs on Fig. 1 having a finger print value of 16 which is marked at the top of each, are turned one revolution. This causes the primary drum to turn one-half of a revolution and record the value 17; 1 to start with plus 16 more equals 17. A half revolution of operating discs having a finger print value of 8 will revolve the primary drums a quarter of a turn adding 8 more and making a total of 25. A quarter revolution of operating discs having a finger print value of 4 will turn the primary drum an eighth of a revolution making the total 29. An eighth turn of operating discs having a finger print value of 2 will turn the primary drum a sixteenth of a revolution, thus adding 2 more making a total of 31. A sixteenth turn of operating discs having a finger print value of 1 will turn the primary a 32nd of a revolution adding 1 more making a total of 32 which is the limit.

The numbers marked above the discs are the numerical values of the prints of the fingers the discs represent, if they have any value, and the notches on the face of the discs indicate what part of a revolution the disc is to be turned to set up its value on the primary drums. For any finger print that has no numerical value, the operator will simply pass by the disc for that finger and go on to the one that does have a value. The entire 1024 primary fractions may be set up on the primary drums by operating the discs as explained, according to the respective values of the fingers they represent. The gear on a particular disc is first meshed into the gear below, then turned as stated and released again as explained previously.

Having set up a primary classification, the sub, and in some cases a 2d sub classification are set up by the ten drums shown on the right portion of Fig. 1. These drums are simply turned with the finger until the desired letter or numeral appears in sight and the corresponding letter or numeral will be at the lower center, face down, over and parallel with, the bed plate.

The final classification is next set up, if any, on the final drums, by turning the knurled knobs 50 and 51 on the right until the number on the right face appears in the windows 48 and 49. The corresponding number on the left face, will then be face down over the bed plate. All the drums when set will be locked in position by the pawls 131 of the locking system.

Any or all of the drums having been set, the lever 160 is operated to slide the bed plate out. This also exposes the ink pads. The levers 52 and 53 are pressed down causing the drum sets to press against the ink pads and be inked, or pigmentized. The finger print card is put on the bed plate under the paper clip, crank 160 is turned to 2nd dotted line position Fig. 2, lever 53 is pressed down printing the complete denominator as set on the drums. Lever 160 is then turned to full line position, lever 52 is pressed down printing the complete numerator. The fraction dividing line (see specimen card Fig. 21) is usually printed on the card, so no provision has been made here to place such on the drum faces. The sheet or card may then be withdrawn by releasing the paper clip. Lever 141 is then moved as indicated by the arrow in Fig. 7, thus releasing the entire lot of drums and allowing them to return to their normal position.

Claims:

1. In a finger print classification machine, setting means, totalizing means and means operatively relating said setting means and said totalizing means whereby to mechanically compute the values that compose the numerators and denominators of the 1024 primary classification fractions of finger prints as used under the Henry system and means operatively related therewith whereby to print a computed value on a finger print card.

2. In a finger print classification machine, a plurality of manually accessible finger print classification computing discs, each having a finger print classification value, and means to indicate individually the various computing discs used in computing a finger print classification value.

3. In a finger print classification machine, a plurality of manually accessible finger print classification computing discs, each having a finger print classification value, and means to indicate individually the various computing discs used in computing a finger print classification value, said means comprising a manually operable lever, the position of which has an indicating function.

4. In a finger print classification machine, a casing, a pair of finger print values imprinted on said casing, a pair of computing discs to which said values are assigned, movement transmitting means cooperating with said computing discs, said discs being manually operable to set said movement transmitting means in motion, means including a set of primary finger print classification numerator and denominator drums whereby the value computed by said discs is placed in printing position by said movement transmitting means, and means to take an impression of said value.

5. In a finger print classification machine, a set of finger print classification numerator and denominator drums, means for computing finger print classification values therewith, means to rectify a value computed in error, means to lock said drums in computed position, said computed position being such that a printing value corresponding to said computed values is adapted to be imprinted by said drums on a finger print card.

6. In a finger print classification machine, in combination, a finger print classification value computing and recording mechanism, a frame member whereon said mechanism is mounted, a housing supported by said frame member, a manually depressible bearing block vertically adjustable in said housing, and a manually operable disc movable with said block into an operative engagement with said finger print classification value computing and recording mechanism.

7. In a finger print classification machine, in combination, a finger print classification value computing and recording mechanism, a frame member whereon said mechanism is mounted, a housing supported by said frame member, a manually depressible bearing block vertically adjustable in said housing, a manually rotatable disc movable with said block, into an operative engagement with said finger print classification value computing and recording mechanism, means whereby the manual rotation of said discs computes a primary finger print classification value, primary drums having number type thereon which are thus brought into a position for recording said computation, and means to mechanically record such computation upon a finger print card.

8. In a finger print classification machine, in combination, a finger print classification value computing and recording mechanism, a frame member whereon said mechanism is mounted, a housing supported by said frame member, a manually depressible bearing block vertically adjustable in said housing, a manually rotatable disc movable with said block, into an operative engagement with said finger print classification value computing and recording mechanism, means whereby the manual rotation of said discs computes a primary finger print classification value, primary drums having number type thereon which are thus brought into a position for recording said computation, means to mechanically record such computation upon a finger print card, said last recited means including a bed plate adapted to carry the finger print card movable into and out of printing relation with said primary drum and means to selectively position said plate relative to said recording mechanism.

9. In a machine for classifying finger prints, a frame, a shaft supported for vertical reciprocation on said frame, a lettered finger print classification numerator drum carried thereby, another shaft supported for vertical reciprocation on said frame, lettered finger print classification denominator drum carried thereby, and means to compute, means to ink, and means to record on a finger print card lettered finger print classification fraction values from and by characters corresponding to the computed values on said numerator and denominator drums forming the parts of said fraction.

10. In a finger print classification machine, a plurality of gears, a plurality of disc members operatively related to said gears, said discs each having its own finger print classification value, a primary numerator classification drum and a primary denominator classification drum, said drums being operatively related to said discs through the medium of said gears and provided with a series of digits adapted for indicating mechanically computed finger print classification values, and mechanism operatively related to said drums whereby a computed finger print classification value may be printed on a finger print card.

11. In a finger print classification machine, in combination a set of gearing, a frame member whereon said gearing is mounted, a housing carried by said frame member, a disc member having a manually operable segment projecting through said housing for mechanically computing finger print classification values, a gear in axial relation to said disc member and fixed thereto to move therewith engageable with a gear in said set of gearing, a primary finger print classification numerator and denominator drum provided with gear means associated with said set of gearing, and means to effect a manual engagement and disengagement of first said gear and a gear in said set of gearing whereby to ascertain on said drums a value computed by said disc member.

12. In a finger print classification machine, manually operable paired mechanism for computing finger print classification values, and means operatively related to said mechanism for recording fractionally the values thus computed on a finger print card.

13. In a finger print classification machine, the combination with a finger print card carrier adapted to adjustably support a finger print card, of means including numerator and denominator drums for computing the classification values of finger print impressions, and means for positioning said supporting means whereby to imprint the computed value correctly on said card.

14. In a finger print classification machine, the combination with a finger print card carrier having card clamping means, of manually manipulative means for operating said clamping means and means for operating said finger print card carrier.

15. In a finger print classification machine, the combination with a finger print card carrier adapted to adjustably support a finger print card, of means including numerator and denominator drums for computing finger print classification values, locking means to hold the computed values in printing position and means to adjust said card carrier whereby the values thus computed may be impressed on the finger print card in the space allotted therefor.

16. In a finger print classification machine, means including numerator and denominator drums to compute a primary finger print classification fraction value, means to ink the character representing said computed value, locking means to hold said computed value in printing position, means to selectively print on a finger print card said finger print classification fraction value, a carrier for said card, means to adjust said carrier to any one of several positions whereby the computed value of said finger print classification value may be properly imprinted on said card and means to unlock said locking means.

17. In a finger print classification machine, printing means the combination with a finger print card carrier having card clamping means, of manually manipulative means for operating said clamping means, and means for operating said finger print card carrier whereby a finger print classification value may be selectively imprinted on a finger print card.

18. In a finger print classification machine, the combination with a set of finger print classification numerator and denominator drums, of a finger print card support operatively related thereto, card clamping means carried thereby, pigmentizing means, means for positioning said finger print card support whereby said drums may be addressed to said pigmentizing means, aforesaid means for operating said finger print card support being also adapted for positioning the latter whereby a finger print classification value set up on said drums may be selectively printed on a finger print card.

19. In a finger print classification machine, a set of finger print classification numerator computing means, a set of finger print classification denominator computing means, and means to print on a finger print card a finger print classification fraction value of which the values set up from each of said sets form the parts.

20. In a machine for classifying finger prints, primary finger print classification numerator and denominator drums, a gear attached to each of said drums, gearing associated with each of said gears, and operating discs provided with means for manipulating said drums through the medium of said gearing whereby to compute a finger print classification fraction value.

21. In a machine for classifying finger prints, primary finger print classification numerator and denominator drums, a gear attached to each of said drums, gearing associated with each of said gears, and operating discs provided with means for manipulating said drums through the medium of said gearing whereby to compute a finger print classification fraction value, shafting supporting said gearing, some of said gearing being fixed to said shafting and other gearing meshing with said fixed gearing being freely rotatable thereon.

22. In a finger print classification machine, the combination of numerator and denominator drum sets each having an impressed surface containing finger print classification values, carriage means for said sets, pigmentizing means, lever means for addressing said drums to said pigmentizing means, and yielding means tending to hold said drums out of pigment applying position.

23. In a finger print classification machine, a set of finger print classification numerator drums, a set of finger print classification denominator drums, both of said drum sets being provided with finger print classification values, indicia on both of said sets corresponding in value to said finger print classification values, adapted for printing on a finger print card, individual means for locking and unlocking said drums, and means for taking an impression of a selected value.

24. In a finger print classification machine, a numerator and denominator drum provided with primary finger print classification values, gearing, and manually operated paired discs to set said drums to desired values thru the medium of said gearing whereby to compute the fraction values that comprise the numerators and denominators of the 1024 primary classification fractions of finger prints as used under the Henry system there being introduced in the computation, by the initial setting of the drums, the fraction $$\frac{1}{1}.$$

25. In a finger print classification machine, a numerator and denominator drum provided with primary finger print classification values, gearing, manually operated paired discs to set said drums to desired values thru the medium of said gearing whereby to compute the fraction values that comprise the numerator and denominators of the 1024 primary classification fractions of finger prints as used under the Henry system and there being introduced in the computation, by the initial setting of the drums, the fraction $$\frac{1}{1},$$

and means associated therewith for selectively printing the computed values in fractional notation on a finger print card.

26. In a finger print classification machine, means provided with indicia for indicating numerator and denominator primary finger print classification fraction values, manually operated means for setting said means to desired finger print classification fraction values, and means whereby the fraction value thus set has initially added to it the fraction $$\frac{1}{1}.$$

27. In a finger print classification machine, paired setting means and means associated therewith for indicating when a primary finger print classification computation has been taken.

28. In a finger print classification machine, means provided with finger print classification indicia operable to be set, setting means manually operable whereby to set said indicia to desired values, and means to address said indicia to a pigment and print said pigmentized indicia on a finger print card.

29. In a finger print classification machine, means provided with finger print classification indicia operable to be set, gearing, setting means manually operable whereby to set said indicia to desired values through the medium of said gearing, and means to address said indicia to a pigment and print said pigmentized indicia in fractional notation on a finger print card.

30. In a finger print classification machine, a primary finger print classification numerator drum, a primary finger print classification denominator drum, indicia on said numerator and denominator drums, means to set said indicia to desired values, there being a preferred value of said indicia common to both drums to which both of said drums are normally set.

31. In a finger print classification machine, paired setting discs having numbers adjacent thereto for computing finger print classification values, a numerator drum and a denominator drum operatively related thereto, there being means on said drums which indicate the value to which the drums have been set, and there being a certain value common to both drums to which the indicated values are automatically added.

32. In a finger print classification machine, paired setting discs and a numerator drum and a denominator drum each provided with type having values operable to be set to desired values by said setting discs, means to position said drums in type printing position, and means to address said type to a pigment and print said pigmentized type on a finger print card.

33. In a finger print classification machine, paired setting discs and a numerator drum and a denominator drum each provided with type having values operable to be set to desired values by said setting discs, means to position said drums in type printing position, shiftable means carrying a finger print card, means to shift said shiftable means to different positions whereby said set values may be inked and properly printed in fractional form on a finger print card.

34. In a finger print classification machine, mechanism whereby to compute the values that compose the numerators and denominators of the 1024 primary classification fractions of finger prints as used under the Henry system, said mechanism comprising manually operated setting means and totalizing means operatively related to said setting means provided with type having values adapted to be set to desired values by manipulating said setting means.

35. In a finger print classification machine, mechanism whereby to compute the values that compose the numerators and denominators of the 1024 primary classification fractions of finger prints as used under the Henry system, said mechanism comprising manually operated setting means and numerator and denominator means provided with indicia adapted to be set to desired values operatively related to said setting means, said numerator and denominator means being normally set whereby the fraction $$\frac{1}{1}$$

may be selectively printed on a finger print card.

36. In a finger print classification machine, a primary finger print classification numerator drum, a primary finger print classification denominator drum, and means to compute and selectively print on a finger print card a primary finger print classification fraction value of which the values computed on said numerator and denominator drums form the parts.

37. In a finger print classification machine, mechanism whereby to compute the values that compose the numerators and denominators of the 1024 primary classification fractions of finger prints as used under the Henry system, said mechanism comprising manually operated setting means, and numerator and denominator means provided with indicia adapted to be set to desired values operatively related to said setting means, said numerator and denominator means being normally positioned whereby the values computed by said setting discs have automatically added thereto the fraction $$\frac{1}{1}.$$

38. In a finger print classification machine, computing mechanism including primary finger print classification numerator means and primary finger print classification denominator means, and means to selectively print on a finger print card a primary finger print classification value of which the values computed on said numerator and denominator means form the parts.

39. In a finger print classification machine, computing mechanism including primary finger print classification numerator means and primary finger print classification denominator means, means to selectively print on a finger print card a primary finger print classification fraction value of which the values computed on said numerator and denominator means form the parts, said numerator and denominator means being normally set whereby the fraction $$\frac{1}{1}$$

is automatically introduced into the computation.

40. In a machine for classifying finger prints, primary finger print classification numerator and denominator drums, a gear attached to each of said drums, gearing associated with each of said gears, and setting discs provided with means for manipulating said drums through the medium of said gearing whereby to totalize the values that compose the numerators and denominators of the 1024 primary classification fraction values of finger prints as used under the Henry system.

41. In a finger print classification machine, mechanism manually operable to be set to compute primary finger print classification values, associated means whereon to totalize the values computed and initially add to said computed values a certain set value, and normalizing means to set said associated means to 1.

42. In a finger print classification machine, setting discs provided with gearing, a pair of shafts provided with gearing to mesh with said disc gearing, numerator and denominator drums provided with type having values and also provided with gearing, other gearing on said shafts to engage the gearing on said drums, said disc gearing through the medium of said shaft gearing being adapted for setting said drums to desired finger print classification values through the manual manipulation of said setting discs.

43. In a finger print classification machine, a series of paired setting discs, means having indicia for totalizing and printing primary finger print classification numerator values computed by manually operating said discs, other means having indicia for totalizing and printing primary finger print classification denominator values computed by manually operating said discs. means operatively relating said discs and each of said means having indicia, and means to shift a finger print card so as to place it in position whereby the values totalized may be properly printed on said card.

44. In a finger print classification machine, mechanism arranged in pairs for manually computing a primary finger print classification value, means operatively related therewith for printing said computed value in fractional form on a finger print card, there being introduced in the computation, by the initial setting of the mechanism, the fraction $$\frac{1}{1}.$$

45. In a finger print classification machine, computing mechanism including primary finger print classification numerator and denominator means whereby to compute or set up primary finger print classification fraction values ready for printing, means to reset said numerator and denominator means whereby to rectify a value computed in error, and means to print said computed value on a finger print card.

46. In a finger print classification machine, a finger print lettered classification numerator drum and denominator drum, each of said drums having a peripheral portion struck from radii of different lengths, setting indicia on the peripheral portion struck from the radius of longer length and printing indicia on the peripheral portion struck from the radius of shorter length, means to set each of said drums and record on a finger print card a finger print lettered classification fraction value of which the particular values selected from said setting indicia form the parts, and gravity operated means comprising a counterweight cast integral with each drum for restoring it to its normal position.

47. In a finger print classification machine, a frame, a train of gearing mounted on said frame, manually operative computing discs operatively related to said train of gearing, a primary classification numerator drum and denominator drum each having a gear operatively related to said train of gearing, a circumferential typed surface on each of said drums, the characters of which represent different primary finger print classification values, derivable from manipulating said operative discs, means for aligning the drums so that the characters representing the values standing thereon are properly positioned for recording, means for inking said characters, means whereby said inked characters may be imprinted on a finger print card, a carriage supported by said frame, shafts upon which said drums are mounted, floating bearing blocks carried by said frame in which said shafts are journalled, and means to simultaneously shift said carriage and depress said shafts whereby the gears on said drums are disengaged from said train of gearing.

48. In a finger print classification machine, a frame, a train of gearing mounted on said frame, computing discs operatively related to said train of gearing, a primary classification numerator drum and denominator drum each having a gear operatively related to said train of gearing, a circumferential typed surface on each of said drums, the characters of which represent different primary finger print classification values, means for aligning the drums so that the characters representing the values standing thereon are properly positioned for recording, means for inking said characters, means to imprint said inked characters on a finger print card, a carriage supported by said frame, shafts upon which said drums are mounted, floating bearing blocks carried by said frame in which said shafts are journalled, means to simultaneously shift said carriage and depress said shafts whereby the gears on said drums are disengaged from said train of gearing, arms mounted on said shafts, rockable shafts journalled in said arms, discs mounted on said rockable shafts, pawls carried by said discs, a ratchet on each of said drums with which one of said pawls engage, means to actuate said pawls at will, dogs mounted on said rockable shafts, each of said dogs having an upstanding lug, and ears carried by said carriage to engage said lugs.

49. In a finger print classification machine, a frame, a train of gearing mounted on said frame, manually operative computing discs each including a gear operatively related to said train of gearing, a primary classification numerator drum and denominator drum each having a gear operatively related to said train of gearing, a circumferential typed surface on each of said drums the characters of which represent different primary finger print classification values, mechanisms for positioning each of said discs to operatively relate its gear with said train of gearing, means for aligning the drums so that the characters representing the values standing thereon are properly positioned for recording, means for inking said characters, means to imprint said inked characters on a finger print card, a carriage supported by said frame, shafts upon which said drums are mounted, floating bearing blocks carried by said frame in which said shafts are journalled, means to simultaneously shift said carriage and depress said shafts to disengage the gear on said drums from said train of gearing, arms mounted on said shafts, rockable shafts journalled in said arms, discs mounted on said rockable shafts, pawls carried by said discs, a ratchet on each of said drums with which one of said pawls engage, means to actuate said pawls at will, dogs mounted on said rockable shafts each of said dogs having an upstanding lug, ears carried by said carriage to engage said lugs, aforesaid means which shifts said carriage and depresses said shafts, being adapted to further shift said carriage after the disengagement of said primary drum gears from said train of gearing, whereby to rock said rockable shafts, and disengage said pawls from said ratchets, and yieldable means mounted on each of said drums actuable upon release of said pawls from said ratchets.

50. In a finger print classification machine, a frame, a train of gearing mounted on said frame, manually operative computing discs operatively related to said train of gearing, a primary classification numerator drum and denominator drum each having a gear operatively related to said train of gearing, a circumferential typed surface on each of said drums, the characters of which represent different primary finger print classification values, means for aligning the drums so that the characters representing the values standing thereon are properly positioned for recording, means for inking said characters, means to print said inked characters on a finger print card, a carriage supported by said frame, shafts upon which said drums are mounted, floating bearing blocks carried by said frame in which said shafts are journalled, means to simultaneously shift said carriage and depress said shafts to disengage the gears on said drum from said train of gearing, arms mounted on said shafts, rockable shafts journalled in said arms, discs mounted on said rockable shafts, pawls carried by said discs, a ratchet on each of said drums with which one of said pawls engages, means to actuate said pawls at will, dogs mounted on said rockable shafts, each of said dogs having an upstanding lug, ears carried by said carriage to engage said lugs, aforesaid means which shifts said carriage and depresses said shafts, being adapted to further shift said carriage after the disengagement of said primary drum gears from said train of gearing, whereby to rock said rockable shafts and disengage said pawls from said ratchets, and a spiral spring mounted in each of said drums actuable upon release of said pawls from said ratchets.

51. In a machine for classifying finger prints, a primary finger print classification numerator drum, a primary finger print classification denominator drum, indicia on each of said drums ranging from 1 to 32, said drums being arranged in a set in horizontal rows, notched operating discs arranged in sets in horizontal rows for setting said drums to desired values each disc representing a finger print value, means for indicating the finger print values of each of said discs, mechanism operatively relating the horizontal rows of said numerator and denominator drums with the horizontal rows of said operating discs, whereby thru the medium of said discs to set said drums to desired values, and means to depress said drums and print said set values in fractional notation on a finger print card.

52. In a machine for classifying finger prints, a primary finger print classification numerator drum, a primary finger print classification denominator drum, indicia on each of said drums ranging from 1 to 32, said drums being arranged in a set in horizontal rows, notched operating discs arranged in sets in horizontal rows for setting said drums to desired values each disc representing a finger print value, means for indicating the finger print values of each of said discs, mechanism operatively relating the horizontal rows of said numerator and denominator drums with the horizontal rows of said operating discs, whereby thru the medium of said discs to set said drums to desired values, means to depress said drums and print said set values in fractional notation on a finger print card, means for locking said drums in their operated position, and yieldable means for normalizing the position of said drums after the same have been unlocked.

53. In a finger print classification machine, a frame, a train of gearing mounted on said frame, manually operative computing discs operatively related to said train of gearing, a primary classification numerator drum and denominator drum each having a gear operatively related to said train of gearing, a circumferential typed surface on each of said drums, the characters of which represent different primary finger print classification values derivable from manipulating said operative discs, means for aligning the drums so that the characters representing the values standing thereon are properly positioned for recording, means for inking said character, and means whereby said inked character may be imprinted on a finger print card.

54. In a finger print classification machine including a casing, a finger print subclassification numerator drum and denominator drum each having peripherally arranged setting and printing indicia in diametrically opposite spaced relation, the faces of said drums containing the setting indicia being struck by a radius of greater length than the faces containing the printing indicia, means to set said drums to desired values, means to de-limit the rotation of said drums, means to record on a finger print card a finger print subclassification fraction value of which the values selected on each of said drums form the parts, and gravity operated means for restoring said drums to their normal position.

55. In a finger print classification machine, a plurality of finger print classification numerator drums, a plurality of finger print classification denominator drums, said numerator and denominator drums being arranged in rows, the numerator drums comprising one row and the denominator drums comprising another row, there being a numerator drum from one row which is paired with a denominator drum from the other row, thereby forming a fraction printing set, all of said drums being provided with means whereby finger print classification values may be set up and recorded, and spacers spacing each of said drums apart in the row, some of said drums being spaced farther apart than the others.

ERNEST E. COMSTOCK.

Certificate of Correction

Patent No. 1,977,229.            October 16, 1934.

ERNEST E. COMSTOCK

It is hereby certified that errors appear in the printed specification of the above numbered patent requiring correction as follows: Page 2, line 137, Example 2, the second part of the fraction should read $\frac{O}{O}$ instead of $\frac{0}{0}$; page 9, line 53, claim 17, strike out the words "printing means" and insert the same after "means," in line 56, of said claim; and that the said Letters Patent should be read with these corrections therein that the same may conform to the record of the case in the Patent Office.

Signed and sealed this 18th day of December, A. D. 1934.